United States Patent
Shimauchi et al.

(10) Patent No.: US 12,226,860 B2
(45) Date of Patent: Feb. 18, 2025

(54) METHOD FOR MANUFACTURING SINTERED GEAR

(71) Applicants: Sumitomo Electric Industries, Ltd., Osaka (JP); Sumitomo Electric Sintered Alloy, Ltd., Takahashi (JP)

(72) Inventors: Kazunari Shimauchi, Osaka (JP); Tomoyuki Ueno, Osaka (JP); Tomoyuki Ishimine, Osaka (JP); Munehiro Noda, Osaka (JP)

(73) Assignees: SUMITOMO ELECTRIC INDUSTRIES, LTD., Osaka (JP); SUMITOMO ELECTRIC SINTERED ALLOW, LTD., Takahashi (JP)

( * ) Notice: Subject to any disclaimer, the term of this patent is extended or adjusted under 35 U.S.C. 154(b) by 500 days.

(21) Appl. No.: 17/608,504

(22) PCT Filed: Apr. 28, 2020

(86) PCT No.: PCT/JP2020/018196
§ 371 (c)(1),
(2) Date: Nov. 3, 2021

(87) PCT Pub. No.: WO2020/226111
PCT Pub. Date: Nov. 12, 2020

(65) Prior Publication Data
US 2022/0226944 A1  Jul. 21, 2022

(30) Foreign Application Priority Data

May 8, 2019 (JP) ................................ 2019-088650

(51) Int. Cl.
*B23P 15/14* (2006.01)
*B22F 3/16* (2006.01)
(Continued)

(52) U.S. Cl.
CPC ................ *B23P 15/14* (2013.01); *B22F 3/16* (2013.01); *B22F 5/08* (2013.01); *B23F 9/082* (2013.01);
(Continued)

(58) Field of Classification Search
CPC .. B22F 5/08; B22F 5/085; B23F 9/082; B23F 9/04; B23F 9/08; B12F 21/16
See application file for complete search history.

(56) References Cited

U.S. PATENT DOCUMENTS 6,116,828 A * 9/2000 Egawa ................. B23F 17/003
409/12
2014/0053405 A1  2/2014 Fleischer et al.
2018/0236548 A1  8/2018 Ishimine et al.

FOREIGN PATENT DOCUMENTS

JP  56-130402 A  10/1981
JP  62-84916 A  4/1987
(Continued)

OTHER PUBLICATIONS

Gimpert ("The Gear Hobbing Process" Gear Fundamentals. 1994) (Year: 1994).*
(Continued)

*Primary Examiner* — Ricardo D Morales
(74) *Attorney, Agent, or Firm* — XSENSUS LLP

(57) ABSTRACT

A method for manufacturing a sintered gear comprising the steps of: preparing a cylindrical green compact; gear-cutting the green compact with a hob; and sintering the gear-hobbed green compact, wherein the hob is such that a ratio of a number of cutting edges thereof per round to a number of starts thereof exceeds 8.

17 Claims, 3 Drawing Sheets

(51) Int. Cl.
  *B22F 5/08*   (2006.01)
  *B23F 9/08*   (2006.01)
  *B23F 21/16*  (2006.01)
  *C22C 38/04*  (2006.01)
  *C22C 38/08*  (2006.01)
  *C22C 38/12*  (2006.01)

(52) U.S. Cl.
  CPC .............. *B23F 21/16* (2013.01); *C22C 38/04* (2013.01); *C22C 38/08* (2013.01); *C22C 38/12* (2013.01); *B22F 2301/35* (2013.01)

(56) References Cited

FOREIGN PATENT DOCUMENTS

| | | | | |
|---|---|---|---|---|
| JP | 2003-334724 | A | 11/2003 | |
| JP | 2007-262536 | A | 10/2007 | |
| JP | 2014-514172 | A | 6/2014 | |
| JP | 2015-208806 | A | 11/2015 | |
| JP | 2017186625 | A * | 10/2017 | ............ B22F 1/0007 |
| WO | 2017/175772 | A1 | 10/2017 | |

OTHER PUBLICATIONS

Abood ("Dynamic Analysis of the Cutting Forces in Gear Hobbing." PhD diss., University of Newcastle upon Tyne, UK, 2002.) (Year: 2002).*

* cited by examiner

METHOD FOR MANUFACTURING SINTERED GEAR

CROSS-REFERENCE TO RELATED APPLICATIONS

The present application is based on PCT filing PCT/JP2020/018196, filed Apr. 28, 2020, which claims priority to Japanese Patent Application No. 2019-088650, filed on May 8, 2019, the entire contents of each are incorporated herein by reference.

TECHNICAL FIELD

The present disclosure relates to a method for manufacturing a sintered gear.

BACKGROUND ART

PTL 1 discloses that machining a green compact into a gear and then sintering the green compact in the form of the gear.

CITATION LIST

Patent Literature

PTL 1: Japanese Patent Laid-Open No. 2017-186625

SUMMARY OF INVENTION

The presently disclosed method for manufacturing a sintered gear comprises the steps of:
preparing a cylindrical green compact;
gear-cutting the green compact with a hob; and
sintering the gear-hobbed green compact, wherein the hob is such that a ratio of a number of cutting edges thereof per round to a number of starts thereof exceeds 8.

DETAILED DESCRIPTION

Figure 1:
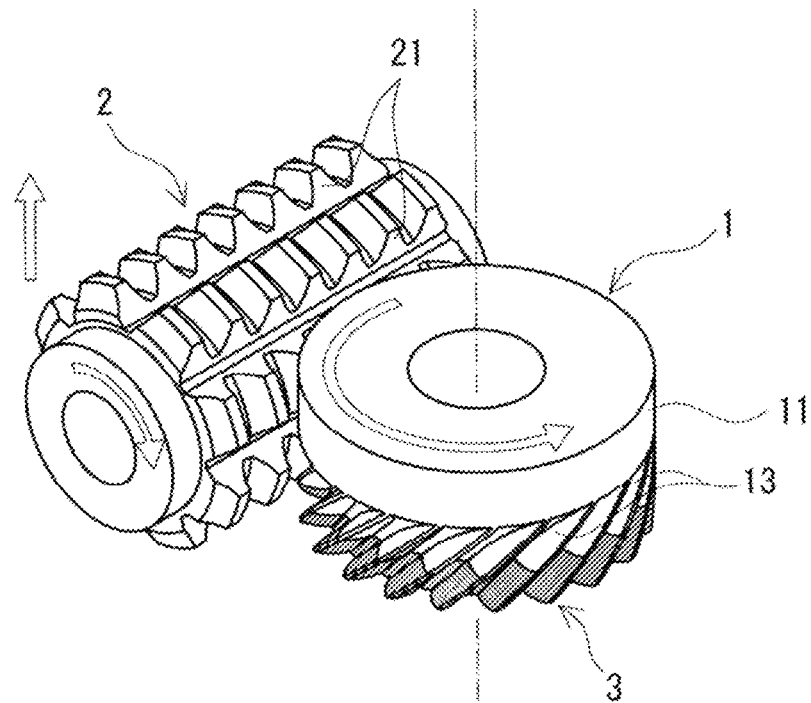
FIG. 1 illustrates a process in a method for manufacturing a sintered gear according to an embodiment.

Problem to be Solved by the Present Disclosure

A green compact is lower in hardness than a sintered material. Therefore, the green compact is easier to cut than the sintered material. The green compact is, however, powder only compressed and solidified, and accordingly, it is brittle and chippable. Therefore, the green compact is chippable while it is cut.

Hobs have been used for cutting gears. A hob includes a cylindrical body having an outer peripheral surface having a thread with a plurality of cutting edges provided along the thread. In gear hobbing, typically, a workpiece is disposed such that its axial direction is a vertical direction and a hob is disposed such that its axial direction is orthogonal to the axial direction of the workpiece. While the hob and the workpiece are synchronously rotated, the hob is fed in the axial direction of the workpiece. Each cutting edge sequentially cuts into the outer peripheral surface of the workpiece to create a gear.

When a hob is used to cut a gear in a green compact, the green compact may chip. In particular, the green compact chips when the hob has cutting edges leaving an end face of the green compact.

An object of the present disclosure is to provide a method for manufacturing a sintered gear, that can suppress chipping of a green compact caused during gear hobbing.

Advantageous Effect of the Present Disclosure

The presently disclosed method for manufacturing a sintered gear can suppress chipping of a green compact caused during gear hobbing.

DESCRIPTION OF EMBODIMENTS OF THE PRESENT DISCLOSURE

As a result of an intensive study on a method for suppressing chipping of a green compact caused during gear hobbing, the present inventors have obtained the following findings:

In order to suppress chipping, the present inventors have considered reducing stress acting on a green compact during gear hobbing. Accordingly, in order to reduce a cutting load per cutting edge of a hob, the present inventors have focused on the number of cutting edges of the hob per round and the number of starts of the hob. When the hob has a larger number of cutting edges per round, the hob cuts a workpiece a larger number of times per rotation. That is, the cutting edges cut the workpiece an increased number of times while the hob rotates once. Therefore, the larger the number of cutting edges per round is, the smaller a cut depth per cutting edge is. In other words, chips reduced in thickness are produced. A cut depth is an amount cut into the green compact radially. Therefore, when a cut depth per cutting edge is small, the cutting load is also reduced. As a result, the green compact receives a reduced main component force and a reduced feed component force, which can reduce stress generated in the green compact. In contrast, a hob having a larger number of starts allows a process to be done more efficiently. When a hob has n starts, a green compact will rotate by n pitches while the hob rotates once. That is, teeth for n pitches are created while the hob rotates once. However, the larger the number of starts of the hob is, the larger a cut depth per cutting edge is accordingly. Therefore, the larger the number of starts of the hob is, the larger a cutting load per cutting edge will be.

Therefore, the larger the ratio of the number of cutting edges of the hob per round to the number of starts of the hob, i.e., the number of cutting edges/the number of starts, is, the smaller a cutting load per cutting edge is, and stress generated in a green compact can be reduced. This can suppress chipping of the green compact. As a result of a diligent study, the present inventors have found that chipping of a green compact can effectively be suppressed by setting a ratio of a number of cutting edges of a hob per round to a number of starts of the hob to exceed 8.

First, embodiments of the present disclosure will be specified and described.

(1) A method for manufacturing a sintered gear according to an embodiment of the present disclosure comprises the steps of:
preparing a cylindrical green compact;
gear-cutting the green compact with a hob; and
sintering the gear-hobbed green compact, wherein
the hob is such that a ratio of a number of cutting edges thereof per round to a number of starts thereof exceeds 8.

In the presently disclosed method for manufacturing a sintered gear, the ratio of the number of cutting edges of a hob per round to the number of starts of the hob exceeds 8, and a cutting load per cutting edge of the hob can be sufficiently reduced. Therefore, stress generated in a green compact during gear hobbing can sufficiently be reduced. The presently disclosed method for manufacturing a sintered gear can thus suppress chipping of the green compact caused during gear hobbing.

(2) As one embodiment of the presently disclosed method for manufacturing a sintered gear,
in the step of gear-cutting, a rate of feeding the hob at one end face of the green compact corresponding to a side from which the cutting edges of the hob leave the green compact may be made slower than a rate of feeding the hob at another end face of the green compact.

The above embodiment makes a rate of feeding the hob at one end face of the green compact corresponding to the side from which the cutting edges of the hob leave the green compact slower than a rate of feeding the hob at the other end face of the green compact, and accordingly, can have the following effects:

A first effect is that chipping of a green compact caused in a vicinity of one end face thereof can be suppressed. In gear-hobbing a green compact, the green compact may chip when the cutting edges of the hob leave an end face of the green compact. In particular, the green compact is chippable in a vicinity of one end face thereof corresponding to a side from which the cutting edges of the hob leave the green compact. When the hob is fed at a reduced rate, an amount fed per cutting edge is reduced. Accordingly, a cut length per cutting edge is reduced. In other words, chips reduced in length are produced. A cut length is an amount cut into a green compact axially. Therefore, when a cut length per cutting edge is reduced, a cutting load is also reduced. As a result, stress generated in the green compact during gear hobbing can further be reduced, and chipping of the green compact caused in a vicinity of one end face thereof can be suppressed.

A second effect is that when the above embodiment is compared with feeding the hob at a fixed slower rate, the former can suppress an increase in a processing time. This is because the hob is fed at a faster rate at the other end face of the green compact than at one end face of the green compact.

(3) In one embodiment of the presently disclosed method for manufacturing a sintered gear,
in the step of gear-cutting, the hob may be fed at a rate of 1.0 mm/rev. or less in a region of the green compact within a maximum of 5 mm from the one end face of the green compact corresponding to the side from which the cutting edges of the hob leave the green compact toward the other end face of the green compact, and the hob may be fed at a rate of 2.0 mm/rev. or more in a region of the green compact other than that region.

When the hob is fed at a reduced rate, an amount fed per cutting edge is reduced. Accordingly, a cut length per cutting edge is reduced. In other words, chips reduced in length are produced. A cut length is an amount cut into a green compact axially. Therefore, when a cut length per cutting edge is reduced, a cutting load is also reduced. As a result, stress generated in the green compact during gear hobbing can further be reduced. Thus, the above embodiment feeding the hob at a rate of 1.0 mm/rev. or less can more effectively suppress chipping of the green compact caused during gear hobbing.

In gear-hobbing a green compact, the green compact may chip when the cutting edges of the hob leave an end face of the green compact. In particular, the green compact is chippable in a vicinity of one end face thereof corresponding to a side from which the cutting edges of the hob leave the green compact. In the above embodiment, the hob is fed at a rate of 1.0 mm/rev. or less in a region of the green compact within a maximum of 5 mm from the one end face of the green compact corresponding to the side from which the cutting edges of the hob leave the green compact toward the other end face of the green compact. Hereinafter, the above-described region may be referred to as a "region in the course of leaving the green compact". Being "within a maximum of 5 mm" means that it is sufficient to feed the hob at a rate of 1.0 mm/rev. or less in at least a portion of a region of the green compact within 5 mm from the one end face of the green compact. As a matter of course, the hob may be fed at a slow rate throughout the region within 5 mm. The above embodiment can thus effectively suppress chipping of the green compact caused in a vicinity of one end face thereof that is particularly chippable. Furthermore, in the above embodiment, the hob is fed at a rate of 2.0 mm/rev. or more in a region other than the region in the course of leaving the green compact. That is, the hob is fed at a relatively slow rate in the region in the course of leaving the green compact. When the region in the course of leaving the green compact is compared with a distance that the hob travels in a gear cutting process from a process starting position to a process ending position, the former is significantly shorter than the latter. Therefore, a period of time required to hob a gear in a single green compact is not significantly increased. The above embodiment can thus suppress an increase in a processing time while suppressing chipping of the green compact. The above embodiment thus allows the green compact to be efficiently processed, and is thus excellent in productivity. Preferably, the region in the course of leaving the green compact has a lower limit for example of 0.1 mm or more, more preferably 0.5 mm or more, 1 mm or more from one end face of the green compact corresponding to the side from which the cutting edges of the hob leave the green compact. Feeding the hob at a rate of 1.0 mm/rev. or less in a region of the green compact within at least 0.1 mm, furthermore 0.5 mm from the end face of the green compact corresponding to the side from which the cutting edges of the hob leave the green compact can sufficiently suppress chipping of the green compact.

(4) As one embodiment of the presently disclosed method for manufacturing a sintered gear,
in the step of gear-cutting, the green compact may be disposed with its axial direction along a vertical direction, and the hob may be fed from a side of a lower end face of the green compact toward a side of an upper end face thereof.

In the above embodiment, the hob is fed in a direction upward along the axial direction of the green compact.

DETAILED DESCRIPTION OF EMBODIMENTS OF THE PRESENT DISCLOSURE

Hereinafter, a specific example of a method for manufacturing a sintered gear according to an embodiment of the present disclosure will be described with reference to the drawings. In the figures, identical reference characters denote identically named components. Note that the present invention is defined by the terms of the claims, rather than these examples, and is intended to include any modifications within the meaning and scope equivalent to the terms of the claims.

<Method for Manufacturing Sintered Gear>

A method for manufacturing a sintered gear according to an embodiment includes the following steps.

First Step: Preparing a cylindrical green compact.
Second Step: Gear-cutting the green compact with a hob.
Third Step: Sintering the gear-hobbed green compact.

One feature of the method for manufacturing a sintered gear according to the embodiment lies in using such a hob that a ratio of a number of cutting edges of the hob per round to a number of starts of the hob exceeds 8. FIG. 1 shows a state in which a green compact 1 is gear-cut with a hob 2. In FIG. 1, blank arrows indicate directions in which green compact 1 and hob 2 are rotated and hob 2 is fed in gear hobbing.

Hereinafter, each step will be described in detail.

<<First Step: Preparing Step>>

In this step, green compact 1 in the form of a cylinder is prepared.

(Green Compact)

Green compact 1 is formed by compressing and thus shaping a powdery raw material containing a powdery metal. The powdery metal is a material mainly constituting green compact 1 and hence a sintered gear. Examples of the powdery metal include iron-based powder made of iron (pure iron) or an iron-based alloy. The pure iron includes having a purity of 99% by mass or more, furthermore, 99.5% by mass or more. Examples of the iron-based alloy include an alloy which contains an additive element and has a balance composed of iron (Fe) and inevitable impurities. The iron-based alloy includes an Fe content of more than 50% by mass, preferably 80% by mass or more, and more preferably 90% by mass or more. Examples of the additive element include one or more elements selected from the group consisting of copper (Cu), nickel (Ni), tin (Sn), chromium (Cr), molybdenum (Mo), manganese (Mn), and carbon (C). The additive element contributes to improvement of mechanical properties of an iron-based sintered gear. Among the above additive elements, a total content of Cu, Ni, Sn, Cr, Mo and Mn is for example 0.5% by mass or more and 5.0% by mass or less, and furthermore, 1.0% by mass or more and 3.0% by mass or less. The C is contained in an amount for example of 0.2% by mass or more and 2.0% by mass or less, and furthermore, 0.4% by mass or more and 1.0% by mass or less. Examples of a content of the powdery metal in the powdery raw material include 90% by mass or more, furthermore, 95% by mass or more. Examples of the powdery metal include those produced through water atomization, gas atomization, the carbonyl process, reduction, or the like.

The powdery metal has an average particle diameter for example of 20 µm or more and 200 µm or less, and furthermore, 50 µm or more and 150 µm or less. When the powdery metal has an average particle diameter within the above range, the powdery metal is easily handled and the powdery raw material is easily compression-molded. This helps producing green compact 1 to have a high density and be hence dense. As a result, a sintered gear of a high density is obtained. The average particle diameter of the powdery metal is an average particle diameter of the particles constituting the powdery metal. The average particle diameter is defined as a particle diameter (D50) for which a cumulative volume in a volumetric particle size distribution as measured with a laser diffraction type particle size distribution measurement device is 50%.

In addition, the powdery raw material may contain at least one of a lubricant and a binder in addition to the powdery metal. A total content of the lubricant and the binder is, for example, 0.1% by mass or less when the powdery raw material as a whole is 100% by mass. Examples of the lubricant include higher fatty acids, metallic soaps, fatty acid amides, and higher fatty acid amides. Examples of the binder include polyethylene, polypropylene, polyolefin, polymethylmethacrylate, polystyrene, polyvinyl chloride, polyvinylidene chloride, polyamide, polyester, polyether, polyvinyl alcohol, vinyl acetate and other similar resins, and paraffin and other similar waxes. The lubricant and the binder may be added as needed, or may not be added.

Green compact 1 can be produced by introducing the powdery raw material into a mold and uniaxially compressing and thus molding it. The mold for molding cylindrical green compact 1 representatively includes a configuration including a die, a lower punch and an upper punch fitted into the die, and a core rod inserted into the die. Pressure applied for molding is, for example, 980 MPa or more, furthermore, 1470 MPa or more, and 1960 MPa or more in particular. Increasing the molding pressure can increase green compact 1 in density. Accordingly, a sintered gear of a high density can be obtained. While the upper limit for the molding pressure is not particularly limited, it is for example 2160 MPa or less, furthermore 2060 MPa or less. Green compact 1 can be produced in a known method.

Green compact 1 preferably has a relative density of 93% or more, furthermore, 95% or more, and particularly preferably 96% or more. While green compact 1 ideally has a relative density of 100%, it may have a relative density of 99% or less in view of manufacturability and the like. The relative density of green compact 1 can be determined as [measured density/theoretical density]×100. A measured density can be obtained based for example on Archimedean principle. A theoretical density can be determined, for example, by calculation from the composition of the powdery raw material.

The size of green compact 1 may be selected, as appropriate, depending on the size of the sintered gear to be manufactured, and it is not particularly limited. Green compact 1 has an outer diameter for example of 20 mm or more and 160 mm or less, and further, 25 mm or more and 150 mm or less. Green compact 1 has an inner diameter for example of 10 mm or more and 80 mm or less, and further, 15 mm or more and 70 mm or less. Green compact 1 has a width, that is, a difference between the inner diameter and the outer diameter, for example of 10 mm or more and 80 mm or less, and further, 15 mm or more and 70 mm or less. Green compact 1 has a height, that is, an axial length, for example of 5 mm or more and 120 mm or less, and further, 10 mm or more and 110 mm or less.

<<Second Step: Processing Step>>

In this step, green compact 1 is gear-cut with hob 2.

(Hob)

Figure 2:
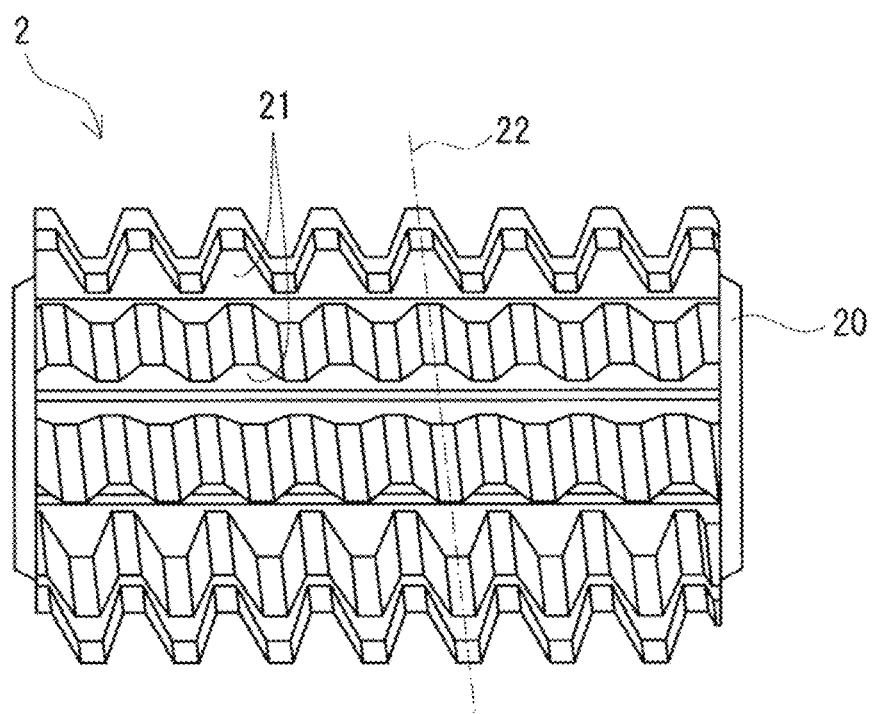
FIG. 2 is a schematic side view of an example of a hob.
Figure 3:
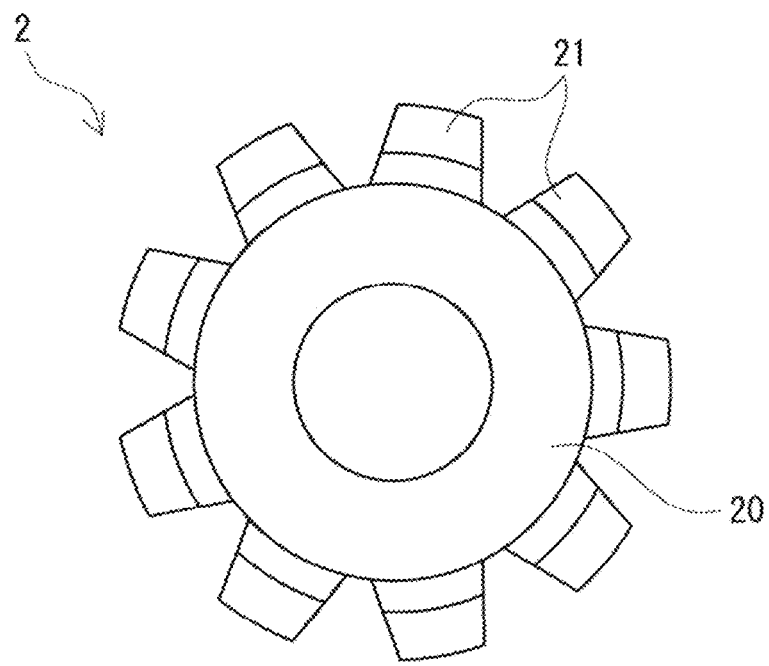
FIG. 3 is a schematic end view an example of a hob.

A schematic configuration of hob 2 will now be described with reference to FIGS. 2 and 3. FIG. 2 is a side view of hob 2 as viewed in a direction orthogonal to the axial direction. FIG. 3 is an end view of hob 2 as viewed in the axial direction. As shown in FIG. 2, hob 2 includes a cylindrical body 20 having an outer peripheral surface having a thread 22 with a plurality of cutting edges 21 provided along the thread. As shown in FIG. 3, hob 2 has nine cutting edges per round.

(Gear Hobbing)

When green compact 1 is gear-cut with hob 2, as shown in FIG. 1, green compact 1 and hob 2 are disposed such that their respective axial directions are orthogonal to each other. Hob 2 is fed in the axial direction of green compact 1 while green compact 1 and hob 2 are synchronously rotated. Teeth 13 for a gear are created as each cutting edge 21 is caused to successively cut into outer peripheral surface 11 of green compact 1. In the present example, green compact 1 is disposed such that its axial direction is in the vertical direction, that is, an upward/downward direction, and hob 2 is disposed such that its axial direction is in the horizontal direction. Green compact 1 rotates counterclockwise when viewed from above. Hob 2 rotates such that cutting edge 21 enters green compact 1 at outer peripheral surface 11 from an upper side. Further, in the present example, hob 2 is fed from the side of the lower end face of green compact 1 toward that of the upper end face thereof. That is, hob 2 is fed in an upward direction and green compact 1 is gear-hobbed from the side of the lower end face thereof, i.e., climb milling. Alternatively, hob 2 may be fed in a downward direction and green compact 1 is gear-hobbed from the side of the upper end face thereof, i.e., conventional milling.

In the present example, hob 2 rotates to cause cutting edge 21 to enter green compact 1 at outer peripheral surface 11 from an upper side. Therefore, cutting edges 21 of hob 2 will leave green compact 1 on the side of the lower end face from outer peripheral surface 11 to the lower end face. In the present example, a case in which green compact 1 is gear-hobbed with a backing plate 3 attached to the lower end face of green compact 1 will be described. Backing plate 3 has a configuration, which will be described hereinafter.

<Ratio of Number of Cutting Edges to Number of Starts>

Hob 2 is such that a ratio of a number of cutting edges thereof per round to a number of starts thereof, i.e., a number of cutting edges/a number of starts, exceeds 8. As has been discussed above, the larger the number of cutting edges per round is, the smaller a cut depth per cutting edge is. Therefore, a cutting load per cutting edge is reduced, and a stress generated in green compact 1 and acting during the process can be reduced. In contrast, the larger the number of starts of hob 2 is, the larger a cutting load per cutting edge will be. Therefore, the larger the number of cutting edges of hob 2 the number of starts of hob 2 is, the smaller a cutting load per cutting edge is, and stress generated in green compact 1 can be reduced. This can suppress chipping of green compact 1. Hob 2 has a number of cutting edges/a number of starts more preferably of 9 or more, particularly preferably 10 or more. While the upper limit for the number of cutting edges/the number of starts is not particularly limited, it is for example 27 or less.

Hob 2 may have a number of cutting edges and a number of starts set as appropriate such that the number of cutting edges/the number of starts exceeds 8. Hob 2 has 9 or more and 27 or less cutting edges, and further, 10 or more and 25 or less cutting edges per round, for example. When hob 2 has an increased number of cutting edges, it is necessary to form cutting edge 21 to be smaller, or to form hob 2 to be larger in outer diameter. Cutting edge 21 made smaller is reduced in strength. Hob 2 formed to have a larger outer diameter has an increased size and becomes costly. Hob 2 has an outer diameter for example of more than 70 mm and 140 mm or less, and further, 80 mm or more and 130 mm or less. Hob 2 has one or more and four or less starts, and furthermore, two or more and three or less starts, for example.

<Feed Rate>

The feed rate of hob 2 can be set as appropriate. The feed rate refers to a distance that hob 2 travels while green compact 1 rotates once, i.e., a feed. A faster feed rate allows a shorter processing time. This, however, invites an increased feed, and hence an increased cut length per cutting edge. This results in an increased cutting load per cutting edge. On the other hand, when the feed rate is reduced, the cut length per cutting edge is reduced, and the cutting load is reduced. An excessively slow feed rate, however, results in a longer processing time and invites reduced productivity. Hob 2 is fed at rate for example of 0.1 mm/rev. or more and 10 mm/rev. or less, further, 0.2 mm/rev. or more and 9 mm/rev. or less. In addition, hob 2 has a cutting rate for example of 40 m/min or more and 280 m/min less, and furthermore, 50 m/min or more and 250 m/min or less.

Figure 4A:
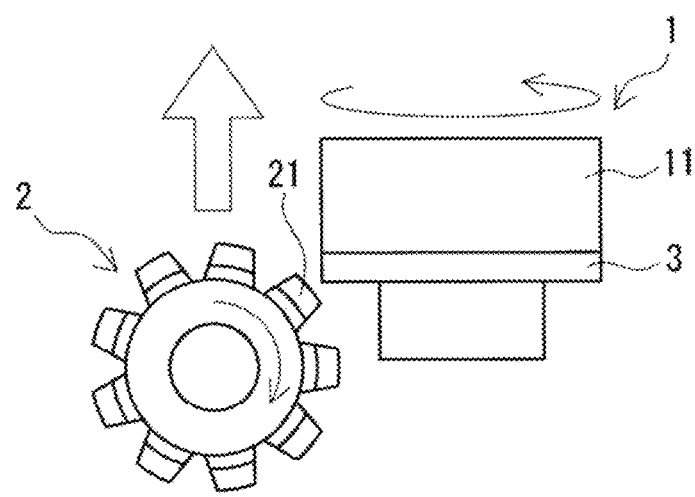
FIG. 4A is a diagram for illustrating a position at which feeding the hob in the process starts.
Figure 4B:
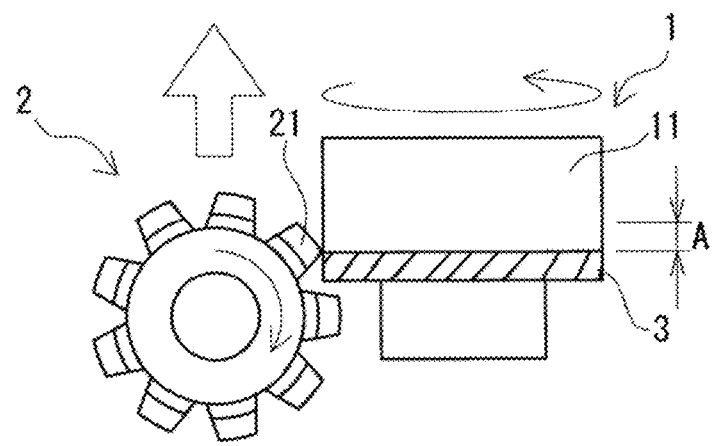
FIG. 4B is a diagram for illustrating a state while the process is underway.
Figure 4C:
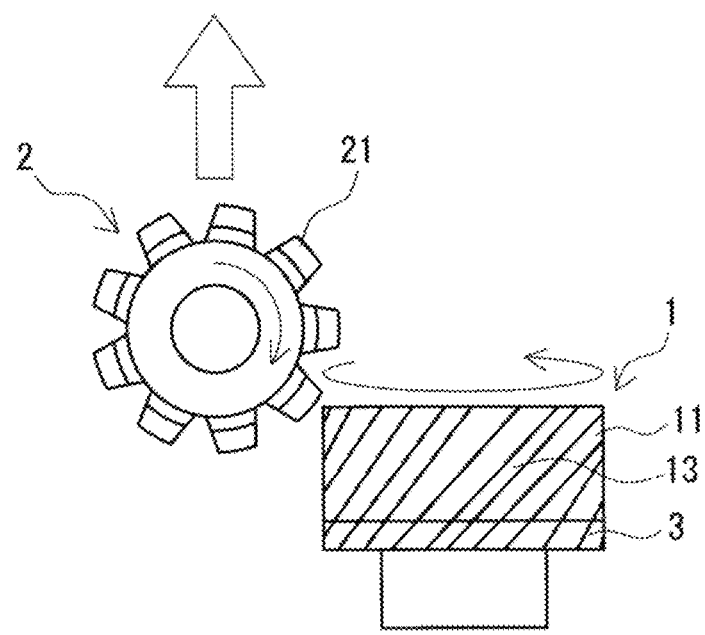
FIG. 4C is a diagram for illustrating a position at which feeding the hob in the process ends.

During gear hobbing, hob 2 may be fed at a fixed rate or a varying rate. An example of processing with a varying feed rate will be described with reference to FIG. 4. FIGS. 4A and 4C show positions at which feeding hob 2 starts and ends, respectively. FIG. 4B shows a state in the course of processing, and shows a state in which cutting edge 21 of hob 2 reaches a region A of green compact 1 in the course of leaving the green compact. Changing a feed rate includes reducing the feed rate at an end face of green compact 1 corresponding to a side from which cutting edges 21 of hob 2 leave green compact 1, i.e., in a vicinity of the lower end face of the green compact, and increasing the feed rate for a portion of the green compact excluding the vicinity of the lower end face and including the other end face of the green compact, that is, the upper end face thereof. In the present example, hob 2 is fed at a slower rate at an end face of green compact 1 corresponding to a process starting side than at an end face of green compact 1 corresponding to a process ending side. More specifically, the hob is fed at a rate of 1.0 mm/rev. or less in a region of green compact 1 within a maximum of 5 mm from the lower end face of the green compact toward the upper end face of the green compact, that is, region A in the course of leaving the green compact, as shown in FIG. 4B. Further, in a region other than region A, the hob is fed at a rate of 2.0 mm/rev. or more. The region other than region A is a section after cutting edges 21 of hob 2 pass through region A in the course of leaving the green compact before cutting edges 21 of hob 2 reach the process ending position.

In gear-cutting green compact 1 with hob 2, green compact 1 may chip when cutting edges 21 of hob 2 leave the lower end face of green compact 1. In particular, green compact 1 is chippable in a vicinity of the lower end face. As in an example of processing as described above, in region A in the course of leaving green compact 1, the hob can be fed at a rate of 1.0 mm/rev. or less to effectively suppress chipping caused at the lower end face of green compact 1. Furthermore, in a region other than region A in the course of leaving green compact 1, the hob can be fed at a rate of 2.0 mm/rev. or more to suppress an increase in a processing time. This allows green compact 1 to be processed efficiently and thus achieves excellent productivity.

<Backing Plate>

As shown in FIG. 1, backing plate 3 may be disposed on the lower end face of green compact 1. In that case, green compact 1 may be cut together with backing plate 3. When green compact 1 is gear-hobbed with backing plate 3 disposed thereon, it has the lower end surface resistant to chipping when cutting edges 21 of hob 2 leave the lower end face of green compact 1. This is because backing plate 3 applied to support the lower end face of green compact 1 allows a force to be applied in a direction in which cutting edges 21 leave the green compact, that is, in a direction to cancel a downward force.

Backing plate 3 can be formed of an appropriately selected material that has rigidity capable of applying a force in a direction in which cutting edges 21 of hob 2 leave the green compact, that is, in a direction to cancel a downward force. Backing plate 3 may be made of metal such as steel or stainless steel.

Backing plate 3 may be shaped to be circular. Backing plate 3 may have an outer diameter equal to that of green compact 1 or may be larger than that of green compact 1. Backing plate 3 and green compact 1 have a difference in outer diameter for example of 0 mm or more and 0.7 mm or less, further, 0.05 mm or more and 0.6 mm or less, 0.1 mm or more and 0.5 mm or less. When backing plate 3 and green compact 1 have a difference in outer diameter of 0.05 mm or more, backing plate 3 easily supports green compact 1 throughout the lower end face. When backing plate 3 and green compact 1 have a difference in outer diameter of 0.7 mm or less, it is easy to prevent backing plate 3 from having a large diameter. Backing plate 3 has a thickness for example of 2 mm or more and 10 mm or less, and furthermore, 3 mm or more and 8 mm or less.

<<Third Step: Sintering Step>>

In this step, green compact 1 gear-hobbed is sintered.

A sintered gear is obtained by sintering green compact 1 gear-hobbed. The sintering can be done under known conditions depending on the composition of the powdery metal. When the powdery metal is powdery iron, an iron-based powdery alloy or the like, the sintering is done at a temperature for example of 1100° C. or higher and 1400° C. or lower, and further, 1200° C. or higher and 1300° C. or lower. The sintering is performed for example for 10 minutes or more and 150 minutes or less, and furthermore, 20 minutes or more and 60 minutes or less, although depending on the size of green compact 1.

(Other Steps)

In addition, the method for manufacturing a sintered gear according to the embodiment may include at least one of the following steps.

<<Finishing Step>>

This step is a step of finishing green compact 1 gear-hobbed. This step is performed after the second step, or the processing step, before the third step, or the sintering step. Examples of the finishing step include chamfering and shaving.

Chamfering and shaving can be done in a known method.

<<Heat Treatment Step>>

This step is a step of heat-treating a sintered gear. This step is performed after the third step, or the sintering step. Examples of the heat treatment include quenching and tempering. Quenching may be carburizing and quenching. Quenching, carburizing and quenching, and tempering can be done under known conditions.

<<Polishing Step>>

This step is a step of polishing a sintered gear. This step is performed after the third step, or the sintering step, or after the sintered gear undergoes heat treatment if it does. Polishing includes gear grinding. Polishing may be done in a known method.

{Effect}

The method for manufacturing a sintered gear according to the embodiment can suppress chipping of green compact 1 caused during cutting a gear with hob 2. This is because using hob 2 having a ratio of a number of cutting edges per round to a number of starts exceeding 8 in the processing step allows a cutting load per cutting edge to be sufficiently reduced. As a result, stress generated in green compact 1 while cutting a gear with hob 2 can be reduced, and chipping of the green compact can thus be suppressed. In particular, hob 2 is fed at a rate of 1.0 mm/rev. or less in region A in the course of leaving green compact 1, and the hob is fed at a rate of 2.0 mm/rev. or more in a region other than region A. This can reduce a processing time while suppressing chipping of green compact 1 more effectively.

The method for manufacturing a sintered gear according to the embodiment can sufficiently reduce chipping of green compact 1 caused during gear hobbing. Specifically, chipping of green compact 1 that is caused at an end face thereof corresponding to a side from which cutting edges 21 of hob 2 leave the green compact, i.e., the lower end face thereof, can be 0.3 mm or less, and furthermore, 0.2 mm or less in length. When chipping of green compact 1 that is caused at an end face thereof is 0.3 mm or less in length, it can be removed in a subsequent step by finishing such as chamfering. The length of the chipping is a length along the axial direction of the green compact measured from the lower end face thereof.

Test Example 1

A test was conducted to cut a gear in a cylindrical green compact with a hob.

A cylindrical green compact having an outer diameter of 45 mm, an inner diameter of 20 mm, and a height of 20 mm was prepared. The green compact was produced as follows: A powdery mixture of iron-based powder and powdery carbon was prepared as a powdery raw material. The iron-based powder has a composition of Fe-1.9Ni-0.2Mn-0.55Mo. The content of the additive element is represented in % by mass. The iron-based powder has an average particle diameter (D50) of 155 μm. The powdery carbon has an average particle diameter (D50) of 5.8 μm. The iron-based powder and the powdery carbon are mixed at a ratio of 99.6:0.4 by mass. The powdery mixture is introduced into a mold, and a uniaxial pressing apparatus was employed to produce a cylindrical green compact. The molding was done with a pressure of 1940 MPa applied. The green compact has a density of 7.71 g/cm$^3$. The green compact has a relative density of 98.8%.

The green compact was cut with the hob into a gear. The gear to be processed has a specification as follows: module: 1.4, number of teeth: 29, pressure angle: 17.5°, and twist angle: 15.8°.

The hob was attached to an NC hobbing machine such that the hob had its axial direction along the horizontal direction, and the green compact was disposed such that its axial direction is in the vertical direction, that is, an upward/downward direction. While the green compact and the hob were synchronously rotated the hob was fed in the axial direction of the green compact to perform gear hobbing. The hob was fed in a direction of climb milling. In Test Example 1, gear hobbing was performed with a backing plate attached to the lower end face of the green compact. The backing plate used was of a melt steel material. The backing plate has a shape of a disc having an outer diameter of 45 mm, an inner diameter of 20 mm, and a height of 5 mm. The green compact and the backing plate are equal in outer diameter. In Test Example 1, gear hobbing was performed under each condition of the following tests A, B, and C.

[Test A]

The hob used has specifications as follows: number of cutting edges per round: 24, number of starts: 2, number of cutting edges/number of starts: 12, and outer diameter: 120 mm. The process was performed at a fixed feed rate of 4.0 mm/rev. That is, the hob was fed at a fixed rate since feeding the hob was started until feeding the hob ended.

[Test B]

The hob used has specifications as follows: number of cutting edges per round: 24, number of starts: 2, number of cutting edges/number of starts: 12, and outer diameter: 120 mm. The process was performed at a feed rate of 0.5 mm/rev in the region in the course of leaving the green compact. Specifically, the hob was fed at a rate of 0.5 mm/rev. in a ±1 mm-section of the green compact from the lower end face thereof in the upward/downward direction, and the hob was fed at a rate of 4.0 mm/rev. in the remaining section. That is, the hob is fed at a rate of 4.0 mm/rev. until the hob's cutting edges reach a position of 1 mm downward from the lower end face of the green compact. At this position, the feed rate is changed to 0.5 mm/rev. and gear hobbing is performed at the changed rate to a position of 1 mm upward from the lower end face of the green compact, and subsequently the feed rate is changed to 4.0 mm/rev.

[Test C]

The hob used has specifications as follows: number of cutting edges per round:
16, number of starts: 2, number of cutting edges/number of starts: 8, and outer diameter: 80 mm. The process was performed at a fixed feed rate of 4.0 mm/rev. That is, the hob was fed at a fixed rate since feeding the hob was started until feeding the hob ended.

(Evaluation of Chipping)

Under each condition of Tests A, B and C, 1000 green compacts were gear-hobbed. The green compacts cut under each condition were evaluated for chipping. Chipping was evaluated as follows: 1000 green compacts processed under each condition each had its lower end face visually inspected in the process, and any chipped green compact was extracted. Any chipped green compact under each condition had its chipped portion observed with an optical microscope and thus had chipping measured in length. Length of chipping is defined as a maximum value of a length thereof from the lower end face of the green compact along the axial direction. As a result, in Test A, chipping had a length with an average value of 0.3 mm. In Test B, chipping had a length with an average value of 0.1 mm. In Test C, chipping had a length with an average value of 0.5 mm.

(Evaluation of Processing Time)

A processing time when a green compact was gear-hobbed under each condition of Tests A, B and C was examined. The processing time is an actual processing time required to hob a gear in a single green compact, in other words, a period of time elapsing since the process starts before the process ends. As a result, in Tests A and C, the processing time was 10 seconds. In Test B, in contrast, the processing time was 11.5 seconds.

From the above results, it can be seen that in Tests A and B using a hob having a number of cutting edges/a number of starts exceeding 8, chipping has a length of 0.3 mm or less and can thus be effectively suppressed. The processing times in Tests A and C and that in Test B had a difference of 1.5 second, and there is no substantial increase in the processing time in Test B.

REFERENCE SIGNS LIST 1 green compact
11 outer peripheral surface
13 teeth
2 hob
20 body
21 cutting edge
22 thread
3 backing plate
A region in the course of leaving the green compact

The invention claimed is:

1. A method for manufacturing a sintered gear comprising the steps of:
preparing a cylindrical green compact;
gear-cutting the green compact with a hob; and
sintering the gear-hobbed green compact to form the sintered gear,
wherein the hob is such that a ratio of a number of cutting edges thereof per round to a number of starts thereof exceeds 8, and
wherein in the step of gear-cutting, within a particular cycle, a feed rate of the hob at a first end face of the green compact corresponding to a process starting side is slower than a feed rate of the hob at a second end face of the green compact corresponding to a process ending side.

2. The method according to claim 1, wherein in the step of gear-cutting, the hob is fed at a rate of 1.0 mm/rev. or less in a first region of the green compact within a maximum of 5 mm from the first end face of the green compact, and the hob is fed at a rate of 2.0 mm/rev. or more in a second region of the green compact other than the first region.

3. The method according to claim 1, wherein in the step of gear-cutting, the green compact is disposed with its axial direction along a vertical direction, and the hob is fed from a side of a lower end face of the green compact toward a side of an upper end face thereof.

4. The method according to claim 2, wherein in the step of gear-cutting, the green compact is disposed with its axial direction along a vertical direction, and the hob is fed from a side of a lower end face of the green compact toward a side of an upper end face thereof.

5. The method according to claim 1, wherein the feed rate of the hob is between 0.2 mm/rev. and 9 mm/rev., and
wherein the cutting rate is between 50 m/min and 250 m/min.

6. The method according to claim 1, wherein the sintering is performed at a temperature between 1100° C. and 1400° C.

7. The method according to claim 1, wherein the hob includes between 16 and 24 edges per round and has two starts, and
wherein the hob has an outer diameter between 80 mm and 130 mm.

8. The method according to claim 1, wherein the formed gear includes 29 teeth, has a pressure angle of 17.5° and has a twist angle of 15.8°.

9. The method according to claim 2, wherein the feed rate of the hob is between 0.2 mm/rev. and 9 mm/rev., and
wherein the cutting rate is between 50 m/min and 250 m/min.

10. The method according to claim 2, wherein the sintering is performed at a temperature between 1100° C. and 1400° C.

11. The method according to claim 2, wherein the hob includes between 16 and 24 edges per round and has two starts, and
wherein the hob has an outer diameter between 80 mm and 130 mm.

12. The method according to claim 2, wherein the formed gear includes 29 teeth, has a pressure angle of 17.5° and has a twist angle of 15.8°.

13. A method for manufacturing a sintered gear comprising the steps of:
preparing a cylindrical green compact;
gear-cutting the green compact with a hob; and
sintering the gear-hobbed green compact to form the sintered gear,
wherein the hob is such that a ratio of a number of cutting edges thereof per round to a number of starts thereof exceeds 8,
wherein the hob includes between 16 and 24 edges per round and has two starts,
wherein the hob has an outer diameter between 80 mm and 130 mm,
wherein in the step of gear-cutting, the hob has a variable feed rate within a particular cycle, and
wherein in the step of gear-cutting, the hob is fed at a rate of 1.0 mm/rev. or less in a first region of the green compact within a maximum of 5 mm from a first end face of the green compact, and the hob is fed at a rate of 2.0 mm/rev. or more in a second region of the green compact other than the first region.

14. The method according to claim 13, wherein in the step of gear-cutting, the green compact is disposed with its axial direction along a vertical direction, and the hob is fed from a side of a lower end face of the green compact toward a side of an upper end face thereof.

15. The method according to claim 13, wherein the feed rate of the hob is between 0.2 mm/rev. and 9 mm/rev., and wherein the cutting rate is between 50 m/min and 250 m/min.

16. The method according to claim 13, wherein the sintering is performed at a temperature between 1100° C. and 1400° C.

17. The method according to claim 13, wherein the formed gear includes 29 teeth, has a pressure angle of 17.5° and has a twist angle of 15.8°.

* * * * *